United States Patent [19]

Schindler

[11] Patent Number: 4,813,752
[45] Date of Patent: Mar. 21, 1989

[54] DELIVERY DEVICE

[76] Inventor: Wolfgang Schindler, Danziger Strase 2, 8057 Eching/Munchen, Fed. Rep. of Germany

[21] Appl. No.: 28,529
[22] Filed: Mar. 20, 1987

[30] Foreign Application Priority Data

Mar. 25, 1986 [WO] PCT Int'l Appl. .................. PCT/EP86/00179

[51] Int. Cl.$^4$ ............................................ A47B 49/00
[52] U.S. Cl. ..................................... 312/268; 198/798
[58] Field of Search ................ 198/798; 312/268, 134; 211/121

[56] References Cited

U.S. PATENT DOCUMENTS

| 557,948 | 4/1896 | Bever | 312/268 |
| 811,720 | 2/1906 | Herder | 211/121 |
| 962,749 | 6/1910 | Davis | 312/268 |
| 1,426,379 | 8/1922 | Hadaway | 211/121 |
| 3,627,110 | 12/1971 | Lichti | 198/798 |
| 4,084,868 | 4/1978 | Lummus | 312/268 |

Primary Examiner—Joseph Falk
Attorney, Agent, or Firm—Richard D. Slehofer

[57] ABSTRACT

This invention concerns a delivery device for the controlled delivery of a multitude of electrical components for assisting in the stuffing of switching PCBs, with the device including a number of elongate magazines each of which can accommodate several bins. The magazines can be moved by means of two continuous sprocket type chain belts which, in each case, are located at the side and are driven via guide sprocket wheels. In this way the bins are moved into the area of a pick up window. In addition, a guide ring system on a projectile is provided. This system is to ensure the permanently horizontal position of the individual magazines with their bins during the magazines' movement along the chain belts.

To achieve a relatively quick pick up from any kind of magazine arrangement along the chain belts in situations that include a great number of bins, the invention offers the following configuration: the two chain belts are equipped, at regular intervals, with pins that extend toward the center, with holding elements which support the magazines pivoted on said pins. Furthermore, the holding elements are equipped with stop members which, in relation to the chain belts, can register in the specified angular positions.

19 Claims, 6 Drawing Sheets

DELIVERY DEVICE

BACKGROUND AND SUMMARY OF THE INVENTION

Today's assembly procedures for stuffing PCB's often involve assembly stations that have a number of magazines with individual bins in their table tops. The electrical components required for the assembly are in the various bins of the magazines. With the help of a suitable drive mechanism, the magazines containing the bins are moved within the table top of the assembly station in such a way that precisely that bin which contains the electrical components required for a particular assembly process is delivered to the area of a pick up window within the table top.

A conventional assembly station of this type, for instance, has twelve magazines within its table top, each containing eight bins. This means that assembly procedures involving 96 different components are possible, with the pick up time being approximately 3 sec in each case. However, it has been found that in some applications of this type of assembly stations, e.g., repair procedures of already assembled PCBs or devices, or assembly procedures of complex devices such as watches, or for the compact storage of spare parts in the case of small components, a projected number of say, 100 bins with a relatively short pick up time is not sufficient.

In order to meet the requirements of this situation, delivery devices have been designed in the meantime where the movement of the magazines which contain the bins does not take place horizontally within the table top of the assembly station but in a vertical direction which would allow a larger number of bins to be used. The devices that result from this type of design are constructed in a manner similar to that of continuous conveyors since they feature the respective chain belts on both sides of the delivery device in question. It is with the help of said chain belts that the respective magazines which contain the bins can be moved along a vertical endless loop.

In the configuration of conventional conveyor devices of the type that is used to transport persons or move passenger cars to their respective places of storage, or for the accommodation of file boxes, the individual transport capsules are more or less "dangling" from the chain belts that perform the vertical transport. This, however, means that transport units of this type can be moved only at a relatively slow pace which, in turn, makes for a relatively long pick up time for the respective articles.

With respect to the achievement of short pick up times, one already known configuration of delivery devices that are based on the endless loop principle provides for additional bearing rails. By means of the latter, the magazines which run on the chain belts are effectively supported and can be placed in a horizontal position regardless of their various locations even if they move at an increased speed. However, it has been found that this type of forced guidance in the form of bearing rails requires considerable assemblage and very precise adjustment in order to keep the delivery device dependable. What is more, even if the above guidance system in form of bearing rails is installed, this will still not lead to optimum transport speed which means that the revised delivery system, with their relative bulk, will still leave things to be desired when it comes to the pick up time at the individual bins.

For the above reasons, it is an object of this invention to further develop the delivery system of the type mentioned initially so as to arrive at a configuration which will result in a relatively short pick up time at any one of the bins even in cases where there are long chain belts with a great number of bin-loaded magazines. With all this, the mechanical aspects of the configuration are to be kept relatively simple.

Based on this invention, the above will be achieved by equipping the two chain belts with pins at regular intervals, with said pins pointing toward the center, and with the holding elements which serve as support for the magazine boxes being pivoted on said pins, and by equipping said holding elements with stop members which, with reference to the chain belts, can be locked into the specified angular position.

BRIEF DESCRIPTION OF THE DRAWINGS

In the following, the invention will be described and explained in more detail. The following views are represented by the respective drawings.

DETAILED DESCRIPTION OF THE PREFERRED EMBODIMENT

Figure 1:
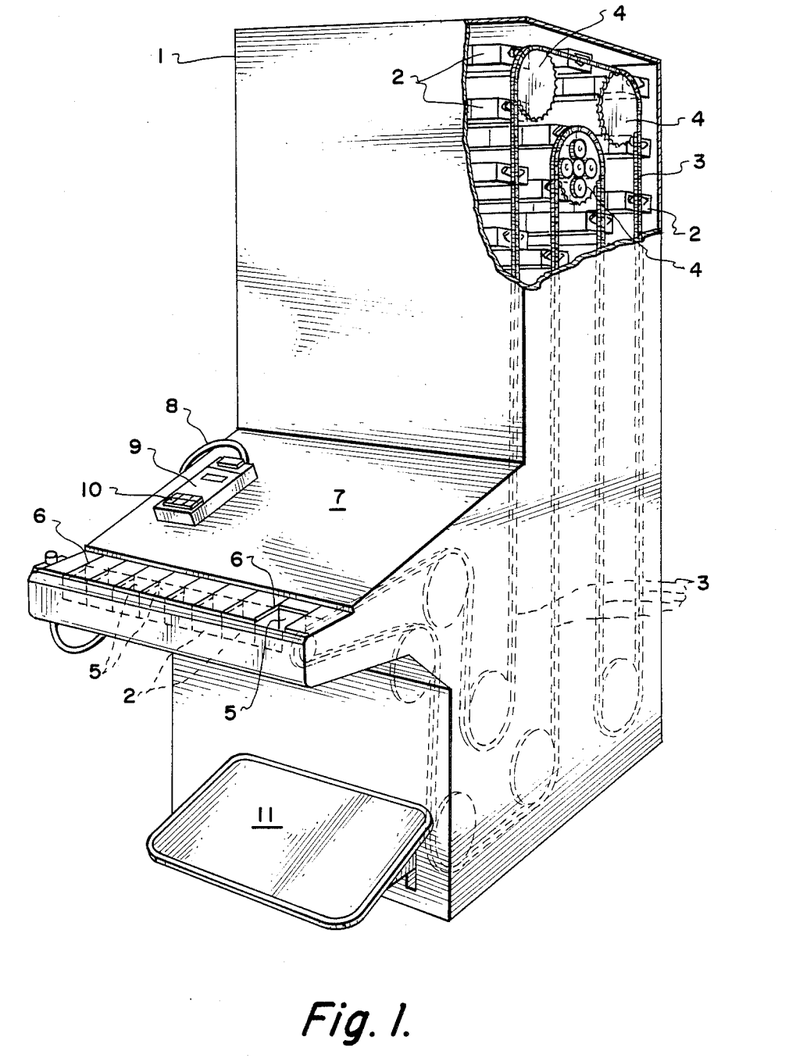
FIG. 1 is a perspective view of a delivery device according to this invention.

FIG. 1 shows a delivery device according to this invention which is provided with a cabinet-like outer shell 1 within which up to seventy-four magazines 2 can be moved along a meandering transport path, or track. Movement is effected by means of corresponding chain belts 3 which run along the sides of the magazines 2. In this configuration the two chain belts 3 are guided via their corresponding guide sprocket wheels 4, with the return of the chain belts 3 at these guide sprocket wheels 4 being either 90 degrees or 180 degrees, whichever is selected.

The drive for the two chain belts 3 is provided by a drive motor (not shown) which, for practical reasons, is designed as a speed-controlled polyphase induction motor. In the area of the two chain belts 3, there should also to be two tightening mechanisms (not shown) to keep the chain belts 3 which run around the guide sprocket wheels 4 in a tightened condition.

In accordance with FIG. 1, each magazine 2 is equipped with eight bins 5 in a side-by-side configuration which, for practical reasons, are designed as insets which can be loaded (inserted) into the magazines. This configuration permits faster reloading of bins 5 when they become empty; it also permits the potential use of bins that are twice or three times as wide as the original ones in order to accommodate larger size components or a larger number of components.

The individual components are picked up from the bins 5 in the magazines 2 in the area of an elongate pick up window 6 which is located in the upper area of a lectern-like attachment 7 of the exterior housing or shell 1. To move a magazine 2 into the area of the elongate pick up window 6, the guide sprocket wheels 4 (inside the outer shell 1) for the continuous chain belts 3 are arranged in such a way that, for a short section of the path, the magazines 2 are moving in the horizontal direction, with said movement taking place within the lectern-like attachment 7 of the outer shell 1.

Within the area of the pick up window 6 which permits component pick up from the eight bins 5 which sit side-by-side in a magazine 2, there is an additional input device 9 with a respective keyboard 10 for the manual control of individual magazines 2 and their bins 5. Among other things, this would facilitate reloading. In general, the control of the delivery device is exerted directly from control electronics of an assembly station which could be located adjacent to it. Such a configuration permits the pick up of electronic components which cannot be stored within the table top of the regular assembly station because of lack of space.

To permit direct utilization of each delivery device for assembly purposes, the depth of the lectern-like attachment 7 of the shell 1 is sufficient to accommodate a dynamic light spot indicator (not shown) of the type that is described in German patent DE-PS No. 27 16 548, and U.S. Pat. No. 4,163,309, with said indicator to be mounted in place. With this light spot indicator, the respective assembly locations can be pointed out optically on each PCB for the various components, with said PCB being clamped in place by means of holding elements (not shown) on the upper surface of the lectern-like attachment 7. The height of the lectern-like attachment 7 as well as that of the foot rest 11, which is provided in addition, is adjusted to make the work at the delivery device as comfortable as possible from an ergonomic standpoint.

Figure 2:
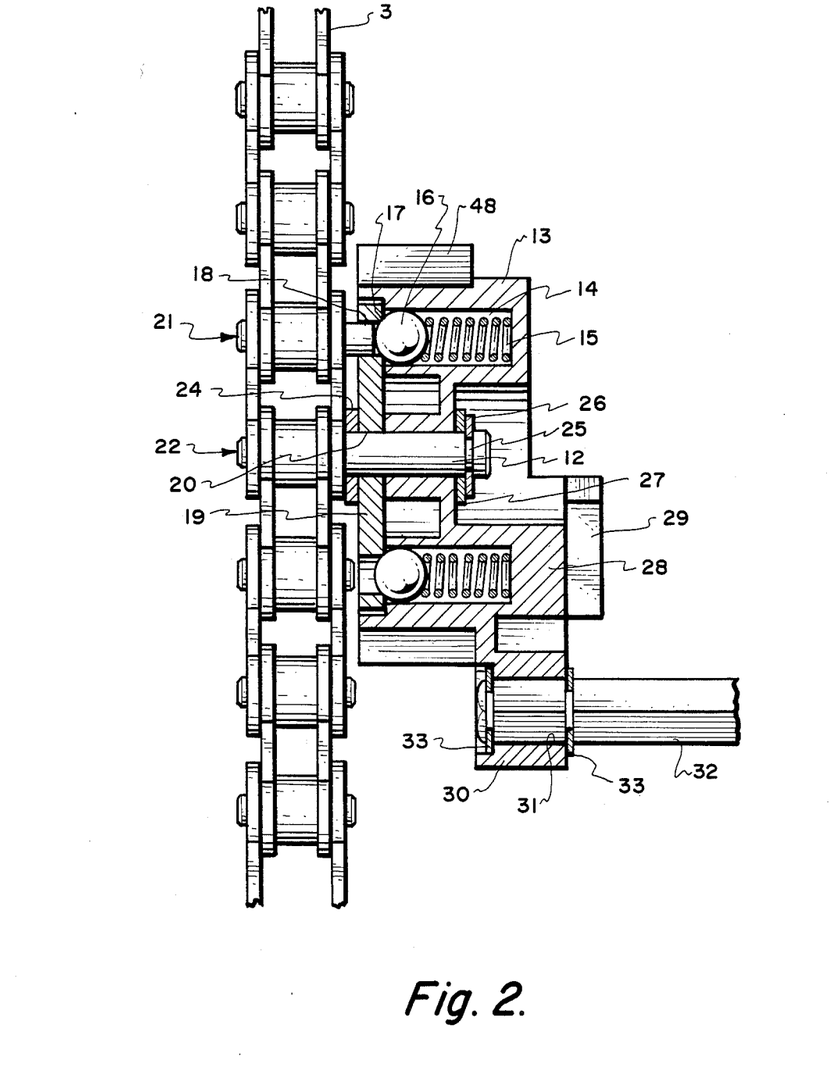
FIG. 2 is a fragmentary view of one segment of a chain belt of the delivery device shown in FIG. 1, with the holding element attached to it.

In order to keep the individual magazines 2 with their bins 5, in a horizontal position during their vertical and horizontal trip within the outer shell 1, the two continuous chain belts 3 are equipped, as illustrated in FIG. 2, with protruding pins 12 which come in regular intervals and on which holding elements 13 are pivoted. These holding elements 13 are each equipped with two cylindrical chambers 14 which are staggered with respect to each other by 180 degrees. In each of said chambers there is a compression spring 15 which presses against a stop ball 16 which is also located within the respective cylindrical chamber 14. With the help of the respective compression springs 15, the two stop balls 16 are being pressed into the conical expansion 17 of the bores 18 which are set within a disk 19 of tempered steel. These disks 19 each have a concentric bore 20 through which the pin 12 is run which belongs to the respective chain belt 3, with said pin 12 serving as a bearing for the holding element 13. The disks 19 are provided with four bores or holes 18 which have a 90 degree displacement toward each other. As a result of this configuration, the stop balls 16 which are affected by the compression springs 15 can, in each case, engage with a 90 degree displacement factor with respect to the corresponding disk 19.

The chain stud 21 of the chain belt 3, being in each case adjacent to the chain stud 22 (which is equipped with the pin 12) has an additional, shorter pin 21, which partly extends into one of the bores 18 of the disk 19. This causes the disk 19 to be aligned in the longitudinal direction of the chain belt 3, respectively. Meanwhile, the holding element 13, which is pivoted on the same pin 12, can assume any position with a 90 degree displacement factor with regard to the disk 19. Thus the chain belt 3, which position is dependent on the locking engagement of the stop balls 16 are, in turn, acted upon by the compression springs 15.

To fix each respective holding element 13 in its position across from the chain belt, an additional shim 24 has been slipped on the pin 12, with said shim keeping the disk 19, and thus the holding element 13, an exact, specified distance across from each respective chain belt 3. Finally, a ring groove 25 is provided in the area of the free end of the pin 12, with a retaining ring 26 fitted into said ring groove 25. This retaining ring 26, in turn, exerts pressure on a disk 27 which keeps the holding element 13 on the pin 12.

The individual holding elements 13 have horizontal protrusions 28 which point toward the center of the delivery device and which serve as a bearing for the cross pieces (not shown) which are provided at the sides of the magazines 2. In addition, the holding elements 13 are provided with two vertical cross pieces 29 in a parallel configuration which engage with the corresponding vertical grooves in the magazines 2, thus keeping the magazines 2 in a fixed position which corresponds exactly to the holding elements 13. Furthermore, the mutual distance of the two vertical cross pieces 29 differs from the right to the left side of the delivery device which means that the magazines 2 can be placed between two holding elements 13 in one position only.

The holding elements 13 all have attachments 30 at or toward the bottom which have square borings 31. Through said square borings 31, which are provided within the protrusions 28 of the holding elements 13, square rods 32 are channeled. With the help of corresponding retaining rings 33, square rods 32 are fixed in positions across from the holding elements 13. These square rods 32 serve as connecting elements between each of the two holding elements 13 that support the magazine 2. This will ensure that, on the one hand, the two chain belts 3 run in precisely the specified distance from each other and, on the other hand, the holding elements 13 will not tip over when the magazines 2 bear down on them.

The functions which are apparent from FIG. 2, as far as they have been described, are all meant to keep the magazines 2 in such a position that their bins 5 are always kept in a horizontal position as far as their upper surfaces are concerned. This position must be preserved as the individual magazines 2 travel on straight paths on the chain belts, either in horizontal or vertical directions.

In the following, those functions apparent from FIG. 3 shall be described which are to ensure this position of the magazines 2 whenever the two chain belts 3 change their direction by 90 degrees or 180 degrees.

Figure 3:
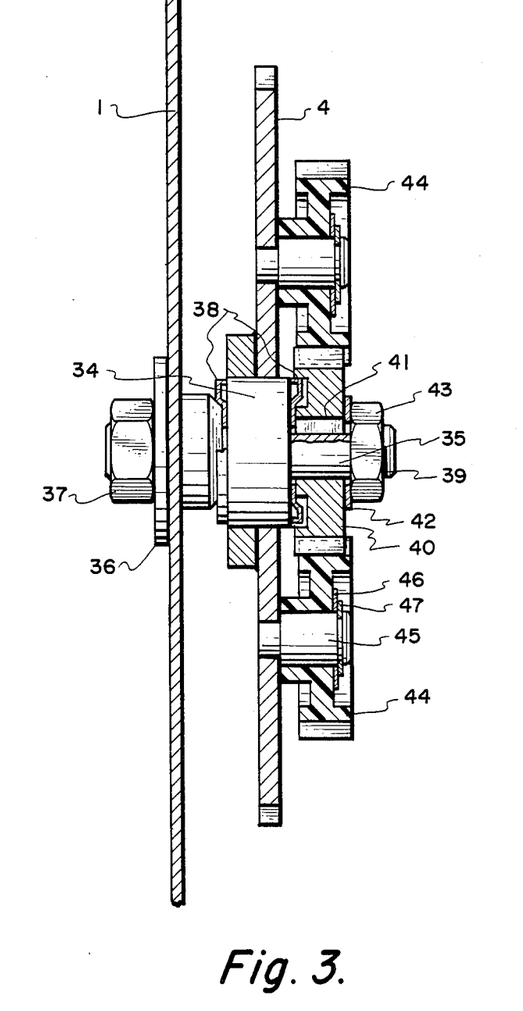
FIG. 3 is a cross sectional view of a guide sprocket wheel for the chain belt (shown in FIG. 2) of the delivery device shown in FIG. 1.

According to FIG. 3, each of the guide sprocket wheels 4 shown in FIG. 1 are provided with its own corresponding roller bearing 34 and rests on a bolt or stay 35. The individual bolts 35 are then fastened either to a frame or directly to the wall of the external shell 1, with washers 36 and one nut 37 being used in each case. In addition, two seals 38 are provided at each side of the roller bearing 34, with said seals 38 ensuring the sealing of each particular roller bearing 34.

On the part that points toward the center of the delivery device, each bolt 35 has a threaded connection 39 on which a spur gear 40 is securely fastened so it cannot turn. This is done by utilizing an adjusting spring 41 and a fan-disk 42, as well as a nut 43. The spur gear 40, in this configuration, forms a sun wheel which mates with four planetary pinions 44 which are all staggered by 90 degrees with respect to each other and which are also designed to be spur gears. In this configuration, these four planetary pinions 44 rest on pins 45 each of which is fastened to its corresponding guide sprocket wheel 4. The respective planetary pinions 44 are fixed in their positions across from the pins 45 of the guide sprocket wheels 4 which is achieved by using the respective washers 46 and retaining rings 47. Said planetary pinions 44 consist of self-lubricating plastic material which eliminates any special lubrication for the planetary pinions 44.

The holding elements 13 shown in FIG. 2 are provided with a toothed rim 48 along their periphery which means that the holding elements 13 are essentially also spur gears. In the return area of the chain belts 3, the toothed rims 48 of each pair of holding elements 13 mate with the planetary pinions 44 which are eccentrically fastened to the guide sprocket wheels 4. With the sun wheel 40 being kept stationary, the planetary pinions 44 will, due to the turning of the guide sprocket wheels 4, rotate in such a way that each pair of holding elements 13 will swivel with respect to the disks 19 which are aligned across from the chain belts 3. This swiveling action depends on whether the chain return in the area of the respective guide sprocket wheel 4 will be 90 degrees or 180 degrees. As a result, the horizontal alignment of the magazines 2 will be maintained within the shell 1. In this configuration, the locking action of the stop balls 16 across from the conical extensions 17 of the bores 18 is designed in such a way that an automatic realignment of the holding elements 13 will be achieved, and the magazines 2 which they support, with said realignment taking place whenever there is even a slight irregularity in the engaging or disengaging process of the toothed rims 48, of the holding elements 13, with respect to the planetary pinions 44 of the guide sprocket wheels 4.

In order to achieve an exact swivel angle of the respective holding elements 13 toward the disks 19 when the chain belts 3 are being returned along the guide sprocket wheels 4, it is important that the centric sun wheel 40 and the toothed rims 48 provided on the holding elements 13 have the same number of teeth if their diameters are the same.

Furthermore, though it is not absolutely necessary, it has been found to be the simplest and most practical approach to also design the planetary pinions 44, which run between the sun wheels 40 and the toothed rims 48 of the holding elements 13, in such a way that they all have the same dimensions that will give the planetary pinions 44 the same number of teeth along their peripheries. Based on this, the diameter of the guide sprocket wheels 4 must be about four times as great as the diameter of the smaller spur gears 40, 44, and 48.

Since the alignment of the magazines 2 is performed with the help of the two chain belts 3, it has been found necessary that said chain belts 3 are to be kept at an exactly specified tensile stress. This is the reason why the delivery device, in addition, is equipped with two chain tension devices whose compression springs are designed to keep the individual segments of the chain belts 3 under a constant tensile stress of approximately 100 kg. Preferably, the chain tension devices should be adjustable so that they will not develop an undesirable slack during the starting action of the delivery device.

The configuration set forth in this invention affords the opportunity for the two chain belts 3 to be driven at a speed of up to 0.68 m/sec without creating angle accelerations within the area of the guide sprocket wheels 4 that would throw the electric components from the bins 5, due to the momentum of the magazines 2 that contain them. If the delivery device is loaded with 74 magazines 2 and if the drive speed of the chain belts 3 is as stated, the access time to any one of the existing 592 bins 5 will be 7 sec maximum. This would be sufficient for most of the special assembly devices under discussion.

To complete this presentation, it must be pointed out that the guide sprocket wheels 4 which are provided within the return area of the two chain belts 3 must have dimensions that will allow them to have a number of teeth which corresponds to a whole-number multiple of the number of chain links between the magazines 2 which are being transported, one after another, at regular intervals. In the configuration which is described here, the individual guide sprocket wheels 4 are provided with 40 teeth each along their peripheries while the chain belts 3 between the individual magazines 2 have ten chain links each. Thus, each individual magazine 2 must be run at 90 degrees along the periphery of a pair of guide sprocket wheels 4 before the next magazine 2 arrives in the area of the return configuration which is formed by the guide sprocket wheels 4. This is the reason that the design described above provides four planetary pinions 44 per each guide sprocket wheel 4. Another requirement of the above described design is that the total length of the two chain belts 3 must amount to a whole-number multiple of that periphery section of the guide sprocket wheels 4 which is formed by two adjacent planetary pinions 44.

In the delivery device described herein, the individual magazines 2 are always delivered to a pick up window within a lectern-like attachment 7 which is located in the front area. However, in a closure lid configuration which will be described in connection with FIG. 4, it is possible to make only one single bin 5 accessible within the pick up window 6, depending on the respective assembly requirements. This means that one particular component can be picked up from the respective delivery device, and no errors are possible. This same closure lid configuration though, will, in certain cases, allow simultaneous pick up from several bins 5. This pertains to the application of magazines 2 with special bins 5 that hold large size components or several components for simultaneous pick up as is required for mounting of a component by means of screws and nuts.

Figure 4:
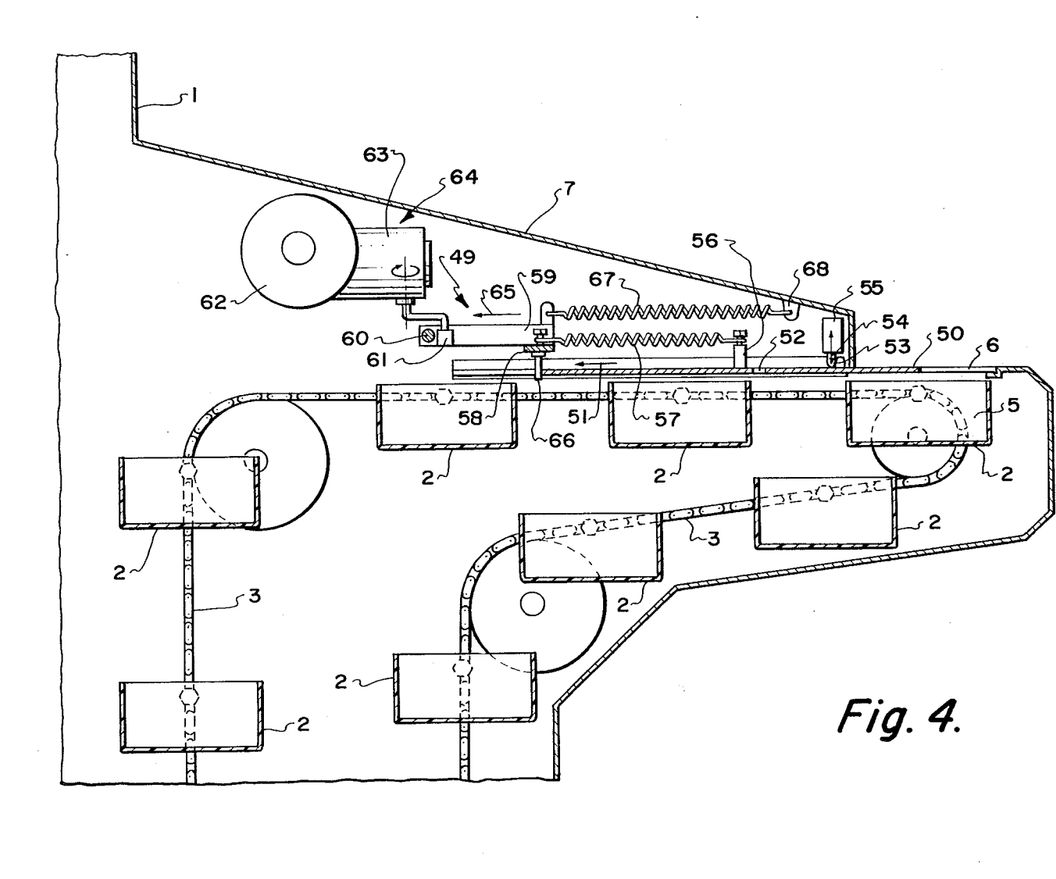
FIG. 4 is a schematic, partly presented as a cross section of the console part of the delivery device shown in FIG. 1.
Figure 5:
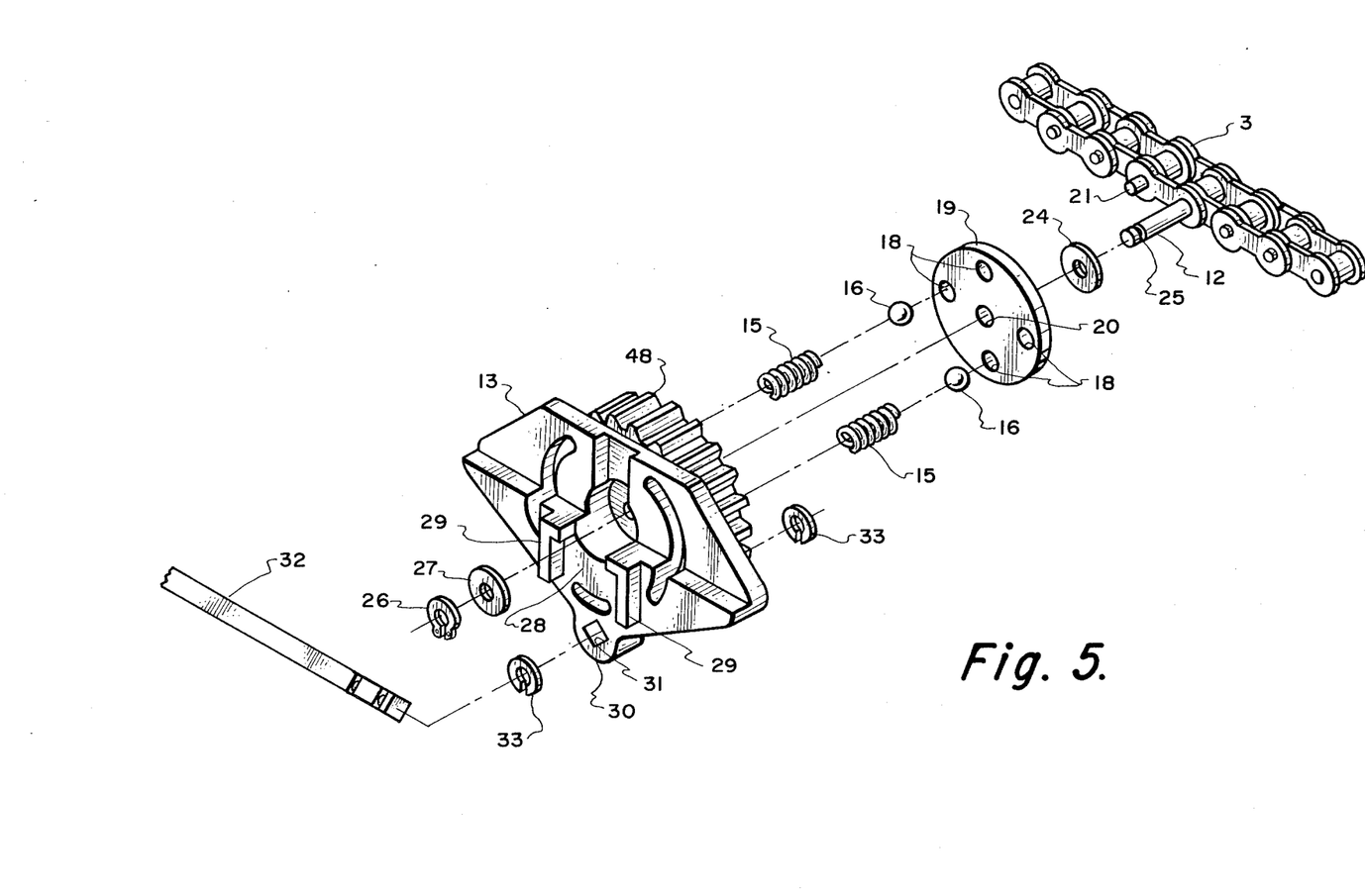
FIG. 5 is an isometric exploded view of one holding element.
Figure 6:
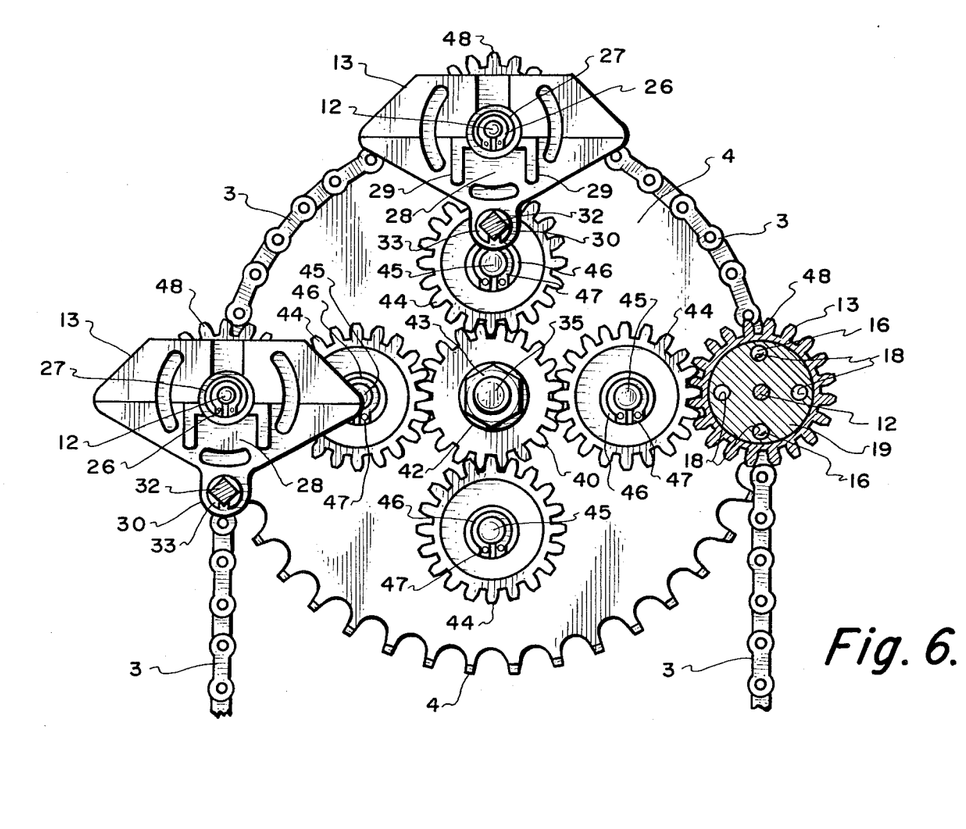
FIG. 6 is a guide sprocket wheel shown in 180 degrees turn with three holding elements, one shown broken away for clarity.

With the help of the closure lid configuration 49 shown in FIG. 4, the eight bins 5 which sit side by side in the magazines 2 can be covered in a manner which will allow access to any one of several bins 5 within the area of the pick up window 6 within the magazine. The closure lid configuration 49 has ten closure lids arranged side by side and which are displaceable. These closure lids, with the exception of the two on the outer ends are for closing the eight bins 5 of each magazine 2 which are arranged side by side while the two lids on the outer ends have a width that makes the access to the entire magazine 2 possible through the respective opening 4 when all ten closure lids are pulled back. All closure lids are identical except for the fact that the two outer ones are narrower than the ones in the inner area.

FIG. 4 shows the outer shell 1 of the delivery device with the lectern-like attachment 7 through which runs a horizontal loop of the two chain belts 3. As can be seen, the magazines 2 hinge on these chain belts 3 at regular intervals with said magazines 2, one at a time, arrive in the area of the pick up window 6.

Any one of the individual bins 5 of each respective magazine 2 can be closed by the various closure lids. One of these closure lids 50 is depicted in FIG. 4. With the help of ball bearings (not shown), each respective closure lid 50 can be moved to the left in the direction of the arrow 51, thus opening the pick up window 6 for that particular bin 2.

Each closure lid 50 has a bore or hole 52 with which a pin 53 engages. This pin 53 is part of the movable anchor 54 of a lifting magnet 55 which is located above the closure lid 50. Thus, the lifting magnet 55, in its non-activated condition, locks the closure lid 50 in the advanced position in which the respective bin 5 of the magazine has been closed.

Furthermore, each individual closure lid 50 is equipped with a pin 56 which points upward and which has a suspended tension spring whose other end is fastened to the cross bar 58 of a carrier 59 which is translatory displaceable. Said carrier 59 has a cross bar 60 with which the crank pin 61 of a window wiper drive 64 engages. The window wiper drive 64 consists of an electric motor 62 and a reduction gear 63. The carrier 59 can be moved in the direction of the arrow 65 by means of the window wiper drive 64 after power admission to the cross bar 60. Due to this, the slide closure lids 50 are also moved if the pin 56 at the lower end has been pulled out of the corresponding closure lid 50. This would take place on account of the activation of the respective lifting magnet 55.

The return of the closure lids 50 to their closed position in which the individual bins 5 of the magazine 2 are covered is achieved by means of the pins 66 which extend downward from the cross bar 58 of the carrier 59 and which press against the ends of the closure lids 50.

However, since the use of the crank pin 61 of the window wiper drive 64 will not result in a forced return of the carrier 59 to its initial position, two additional tension springs 67 are provided at the two ends of the cross bar 58 of the carrier 59, with the tension springs 67 being arranged in parallel to the tension springs 57. However, as opposed to the tension springs 57, these additional tension springs 67 are directly suspended from a fixed housing part 68. This means that they will achieve the return of the carrier 59 even if all lifting magnets 55 are activated and all tension springs, therefore, are under low pulling tension due to the bringing up of the slide closure lids 50. In this way, the individual closure lids 50 can be pushed back into their closed position with relatively low force, eliminating any danger of injury to the fingers of the operator who might leave them in the open bin 5 too long.

In conclusion, it can be said that the closure lid configuration 49 which is described herein can, with the help of one single electric drive 64, simultaneously open any number of translatory displaceable closure lids 50, with the opening of the individual closure lids 50 depending on the activation of their assigned lifting magnets 55. In this process, the opening as well as the closing of the individual closure lids 50 is done with the help of interposed tension springs 57, 67 which largely eliminates undesirable operating problems.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

What is claimed is:

1. A delivery device for the controlled dispensing of electronic components for use in the assembly of printed circuit boards comprising:
    a first vertical planar mounting surface;
    a second vertical planar mounting surface positioned in a parallel spaced relationship with said first mounting surface;
    a first array of rotatable sprockets fastened in a stationary and coplanar position to said first vertical mounting surface and forming a first track between said first array of sprockets;
    a second array of rotatable sprockets having the same pattern as said first array and fastened in a stationary and coplanar position to said second vertical mounting surface and in a mirror image configuration with said first array of sprockets and forming a second track between said second array of sprockets;
    each said sprocket having a stationary spur gear positioned concentrically on one side and meshing with at least one pinion gear radially positioned to said spur gear;
    a first endless link chain belt installed on said first track and having a length sufficient to encompass the route of said first track;
    a second endless link chain belt installed on said second track and having a length sufficient to encompass the route of said second track;
    a first series of pairs of shorter and longer pins connected to and extending inwardly from said first endless link chain belt and spaced at intervals to one another;
    a second series of pairs of shorter and longer pins connected to and extending inwardly from said second endless link chain belt and spaced at intervals to one another and in a mirror image configuration to said first series of pins;
    holding element means pivotally attached to each of said longer pins for supporting magazines positioned transversely between said first and said second endless chains;
    each said holding element means including a rotatable spur gear;
    disk means interposed between said chain and said spur gear;
    ball biasing means for changeably positioning said rotatable spur gear with said disk means as said holding means comes into contact with and meshes with said at least one pinion gear on a particular sprocket;
    stop member means attached to said holding element means for registering in a specified angular position relative to said endless chain belts;
    said magazines being movable by said endless chain belts into the area of a pick up window and the tops said magazines always being in a horizontal attitude regardless of where any said magazine is positioned on said tracks of said chains for preventing any one of said magazines from tilting and spilling its contents of electronic components loaded in bins in said magazines.

2. The delivery device as recited in claim 1 further comprising:
said holding elements including rotatable spur gears having the same diameter, the same pitch, and the same number of teeth;
four planetary pinion gears fastened to one side of said guide sprocket wheels each having the same diameter, the same pitch and the same number of teeth;
said stationary sun spur gears which are fastened in a concentric manner on the axles of the guide sprocket wheels having the same pitch, the same number of teeth and the same diameter.

3. The delivery device as recited in claim 2 further comprising:
said four planetary pinion gears being rotatable on said individual guide sprocket wheels and staggered by 90 degrees with respect to each other.

4. The device as recited in claim 1 further comprising:
said disk means is a disc which can swivel on each of said longer pins of said two chain belts;
said disc having bores;
said shorter pin mating with one of said bores while a spring loaded stop ball of said holding element being pressed in a conical expansion of said bore.

5. Delivery device according to claim 4 wherein said discs having four bores which are staggered by 90 degrees with respect to each other;
said holding elements which support the magazines having two cylindrical chambers which are staggered by 180 degrees with respect to each other;
said chamber receiving a compression spring in a stop ball.

6. Delivery device according to claim 1 further comprising:
said holding elements having attachments at their lower ends;
rods being channeled through said bores, each of said rods serving as a connection between said two holding elements for pairing them up.

7. The delivery device, according to claim 6 wherein said rods are square bars which are then used as holding elements by channeling them through said corresponding square bores.

8. The delivery device as recited in claim 1 further comprising:
said holding elements being equipped with horizontal protrusions which point towards the center with said magazines coming to rest with their sides on said protrusions;
said holding elements having vertical cross pieces for fitting into said corresponding vertical grooves of said magazines once said magazines are being positioned in place.

9. The delivery device as recited in claim 8 wherein said vertical cross pieces on both sides of said holding elements differing in width from said vertical grooves provided on both sides of said magazines for allowing said magazines to be inserted into said corresponding pairs of said holding elements in one position only.

10. The delivery device as recited in claim 1 further comprising:
within the area of said pick up window, said individual bins of said magazines having displaceable closing lids assigned to each one of them which with the help of corresponding lifting magnets can be locked in the closed positions;
said displaceable closing lids are connected via corresponding tension springs with a carrier which is also displaceable and which can be moved back and forth by means of an electrical motor.

11. The delivery device according to claim 1 further comprising:
said displaceable carrier being equipped with the resting surfaces in the form of pins which point downward and which close said displaceable closing lids by pushing them into the front closed position.

12. The delivery device according to claim 11 further comprising:
said displaceable carrier has by means of additional tension springs having been pushed into a position in which said pins which are attached to said carrier cause the pick up window to be closed;
said carrier being equipped with a cross bar;
abutting against said cross bar is a crank bin provided at the reduction gear of said electric motor which forces said carrier into the position in which it triggers the opening mechanism of said closing lids.

13. The delivery device as recited in claim 12 further comprising:
said individual closing lids having bores for mating with said corresponding pins at the front end of said respective lifting magnets.

14. The delivery device according to claim 13 further comprising
an additional displaceable closing lid on both sides of said closing lids assigned to the bins for allowing the removal and or exchange of said entire magazine when all said closing lids which have been assigned to said bins open simultaneously plus the two additional closing lids.

15. Delivery device as recited in claim 14 further comprising:
in the case of magazines having eight bins each provision for a total of ten displaceable closing lids being connected via tension springs running parallel to each other with the cross bar of the carrier;
both ends of said cross bar of the carrier providing for the engagement of two additional tension springs which force said displaceable carrier into its front position.

16. The delivery device as recited in claim 15 wherein said various tension springs having been designed in such a way that they are essentially tension free once said closing lid and said carrier are not in their activated positions.

17. The delivery device according to claim 16 wherein said closing lids and said carrier resting on ball bearing rails.

18. The delivery device according to claim 17 further comprising:
said device being equipped with a lectern-like attachment which in its front part and towards the upper surface has a pick up window.

19. The delivery device according to claim 18 further comprising:
said lectern like attachment having dimensions for making it suitable for installing a light spot indicator beside said holding elements for the PCB that is to be assembled with said indicator directing a light beam to the assembly location and optically pointing it out.

* * * * *